(12) United States Patent
Chekansky

(10) Patent No.: US 10,378,449 B2
(45) Date of Patent: Aug. 13, 2019

(54) TURBOCHARGER SHAFT SEAL

(71) Applicant: BorgWarner Inc., Auburn Hills, MI (US)

(72) Inventor: Jason W. Chekansky, Asheville, NC (US)

(73) Assignee: BorgWarner Inc., Auburn Hills, MI (US)

(*) Notice: Subject to any disclaimer, the term of this patent is extended or adjusted under 35 U.S.C. 154(b) by 458 days.

(21) Appl. No.: 14/425,474

(22) PCT Filed: Sep. 10, 2013

(86) PCT No.: PCT/US2013/058923
§ 371 (c)(1),
(2) Date: Mar. 3, 2015

(87) PCT Pub. No.: WO2014/046909
PCT Pub. Date: Mar. 27, 2014

(65) Prior Publication Data
US 2015/0233299 A1  Aug. 20, 2015

Related U.S. Application Data

(60) Provisional application No. 61/702,328, filed on Sep. 18, 2012.

(51) Int. Cl.
F02C 6/12 (2006.01)
F02C 7/28 (2006.01)
(Continued)

(52) U.S. Cl.
CPC .............. *F02C 7/28* (2013.01); *F01D 11/003* (2013.01); *F01D 25/186* (2013.01); *F02C 6/12* (2013.01);
(Continued)

(58) Field of Classification Search
CPC .. F02C 7/28; F02C 6/12; F01D 11/003; F01D 11/02; F01D 25/183; F05D 2220/40;
(Continued)

(56) References Cited

U.S. PATENT DOCUMENTS 4,314,705 A  2/1982 Shimizu
5,066,192 A  11/1991 Honda et al.
(Continued)

FOREIGN PATENT DOCUMENTS

CN  201908717 U  7/2011
CN  202280830 U  6/2012
(Continued)

*Primary Examiner* — Carlos A Rivera
*Assistant Examiner* — Jesse M Prager
(74) *Attorney, Agent, or Firm* — Young Basile Hanlon & MacFarlane, P.C.

(57) ABSTRACT

A seal (42, 82) for a shaft (22) of a turbocharger (10) to prevent liquid from leaking out of a bearing housing (16). The seal (42, 82) includes a cylindrical body extending between opposite end faces (116, 118) and has a cylindrical bore extending between the opposite end faces (116, 118) for receiving the shaft (22) therethrough. The cylindrical bore defines an inner surface (106) having at least one striation (112) extending in a helical direction about the shaft (22). Rotation of the shaft (22) relative to the seal (42, 82) causes a pumping effect on liquid present between the shaft (22) and the inner surface (106) of the seal (42, 82), thereby causing the liquid to flow back towards the bearing housing (16).

5 Claims, 4 Drawing Sheets

(51) Int. Cl.
   *F01D 11/00* (2006.01)
   *F01D 25/18* (2006.01)
   *F16J 15/40* (2006.01)

(52) U.S. Cl.
   CPC ........... *F16J 15/40* (2013.01); *F05D 2220/40* (2013.01); *F05D 2240/55* (2013.01); *F05D 2250/25* (2013.01); *F05D 2250/281* (2013.01)

(58) Field of Classification Search
   CPC ...... F05D 2240/55; F16J 15/40; F16J 15/164; F16J 15/4472
   See application file for complete search history.

(56) References Cited

U.S. PATENT DOCUMENTS

| | | | |
|---|---|---|---|
| 5,217,233 A | 6/1993 | Pecht et al. | |
| 5,322,298 A * | 6/1994 | Maier | F16J 15/441 277/430 |
| 5,503,407 A * | 4/1996 | McNickle | F16J 15/002 277/348 |
| 6,368,077 B1 * | 4/2002 | Meyerkord | F01D 11/02 277/320 |
| 6,406,253 B2 | 6/2002 | Heyes | |
| 6,932,350 B1 * | 8/2005 | Husted | F16J 15/406 277/421 |
| 7,086,842 B2 | 8/2006 | Wild | |
| 8,286,969 B2 * | 10/2012 | Chochua | F01D 11/003 277/418 |
| 2008/0284105 A1 * | 11/2008 | Vasagar | F16J 15/3244 277/306 |
| 2009/0322031 A1 * | 12/2009 | Roche | F01D 11/02 277/348 |
| 2010/0230905 A1 * | 9/2010 | Iizuka | F16J 15/164 277/584 |
| 2010/0253005 A1 * | 10/2010 | Liarakos | F16J 15/164 277/353 |
| 2010/0276893 A1 * | 11/2010 | Jewess | F16J 15/164 277/424 |

FOREIGN PATENT DOCUMENTS

| | | |
|---|---|---|
| CN | 202300639 U | 7/2012 |
| DE | 102008055948 A1 | 5/2010 |
| JP | S55-170420 U | 12/1980 |
| JP | 08284675 | 10/1996 |
| JP | 2524139 Y2 | 1/1997 |
| KR | 10-2012-0089291 A | 8/2012 |
| WO | 2008042698 A1 | 4/2008 |

* cited by examiner

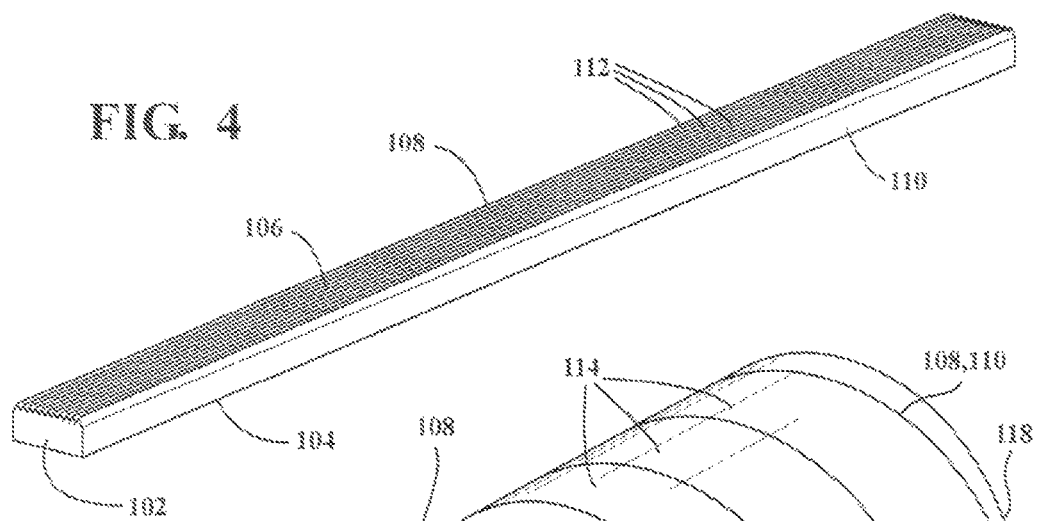
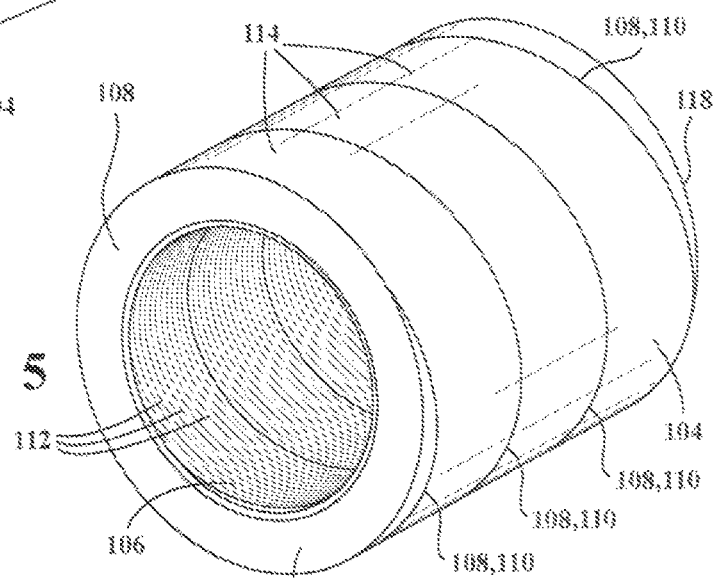
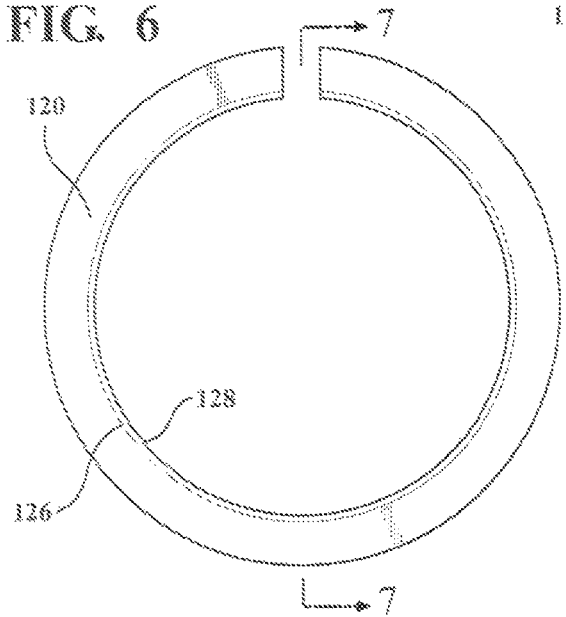
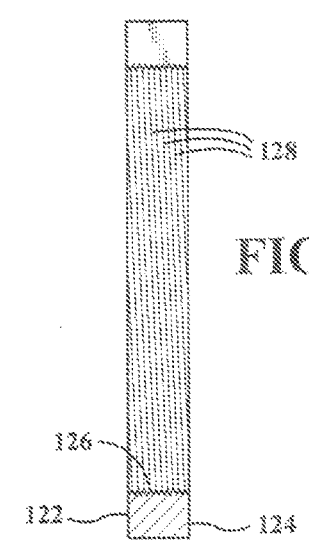

TURBOCHARGER SHAFT SEAL

CROSS-REFERENCE TO RELATED APPLICATION

This application claims priority to and all the benefits of U.S. Provisional Application No. 61/702,328, filed on Sep. 18, 2012, and entitled "Turbocharger Shaft Seal."

BACKGROUND OF THE INVENTION

1. Field of the Invention

The present invention relates to a seal for a rotating shaft of a turbocharger. More particularly, the present invention relates to a seal with an inner surface having a plurality of striations extending in a helical path about a rotating shaft of a turbocharger.

2. Description of Related Art

A turbocharger is a type of forced induction system used with internal combustion engines. Turbochargers deliver compressed air to an engine intake, allowing more fuel to be combusted, thus boosting an engine's power density without significantly increasing engine weight. Thus, turbochargers permit the use of smaller engines that develop the same amount of power as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of reduced emissions.

Turbochargers include a turbine housing connected to the engine's exhaust manifold, a compressor housing connected to the engine's intake manifold, and a bearing housing connecting the turbine and compressor housings together. A turbine wheel in the turbine housing is rotatably driven by an inflow of exhaust gas supplied from the exhaust manifold. A shaft is rotatably supported in the bearing housing and couples the turbine wheel to a compressor impeller in the compressor housing so that rotation of the turbine wheel causes rotation of the compressor impeller. The shaft connecting the turbine wheel and the compressor impeller defines an axis of rotation. As the compressor impeller rotates, it compresses ambient air entering the compressor housing, thereby increasing the air mass flow rate, airflow density, and air pressure delivered to the engine's cylinders via the engine's intake manifold.

The shaft coupling the turbine wheel and compressor impeller extends into the turbine housing through a turbine side of the bearing housing. The shaft also extends into the compressor housing through a compressor side of the bearing housing. One or more piston rings are typically used as a seal between the shaft and the turbine side of the bearing housing to prevent lubricating oil within the bearing housing from migrating into the exhaust gas in the turbine housing. Similarly, one or more piston rings are also typically used as a seal between the shaft and the compressor side of the bearing housing to prevent lubricating oil within the bearing housing from migrating into the compressed air in the compressor housing. The piston rings also prevent the exhaust gas and compressed air from migrating into the bearing housing.

The piston rings act as a labyrinth seal. Labyrinth seals are a type of mechanical seal which are not fluid-tight but limit leakage by means of providing a tortuous path through which a substance, i.e., lubricating oil, must flow. In addition to the piston rings on the turbine side, a pressure in the turbine housing is generally greater than a pressure in the bearing housing such that lubricating oil does not tend to leak out of the bearing housing past the piston rings and into the exhaust gas in the turbine housing. Likewise, in addition to the piston rings on the compressor side, a pressure in the compressor housing is generally greater than a pressure in the bearing housing such that lubricating oil does not tend to leak out of the bearing housing past the piston rings and into the compressed air in the compressor housing.

Since the pistons rings are not fluid-tight, the pistons rings may not entirely prevent lubricating oil from leaking into the turbine housing and/or the compressor housing. For example, under some engine operating conditions, the pressure in the turbine housing is less than the pressure in the bearing housing, which may allow lubricating oil to leak past the piston rings on the turbine side into the turbine housing. Lubricating oil that leaks past the piston rings on the turbine side is usually burned by the exhaust gas and is discharged with the exhaust gas as blue smoke. Similarly, under some engine operating conditions, the pressure in the compressor housing is less than the pressure in the bearing housing, which may allow lubricating oil to leak past the piston rings on the compressor side into the compressor housing. Lubricating oil that leaks past the piston rings on the compressor side may accumulate in the intake system or mix with the incoming air and be burned during the combustion process, thereby hindering engine performance. In addition, burning oil during the combustion process leads directly to increased emissions.

It is desirable, therefore, to minimize the amount of lubricating oil leaking into the turbine housing and/or the compressor housing. As such, it is desirable to provide improved seals between the shaft and the bearing housing.

SUMMARY OF THE INVENTION

According to a first embodiment of the invention, a seal for a shaft of a turbocharger prevents liquid from leaking out of a bearing housing. The seal includes a cylindrical body extending between opposite end faces and has a cylindrical bore extending between the opposite end faces for receiving the shaft therethrough. The cylindrical bore defines an inner surface having at least one striation extending in a helical direction about the shaft. The seal encircles the shaft and is disposed radially between the shaft and the bearing housing. Rotation of the shaft relative to the seal causes a pumping effect on liquid present between the shaft and the inner surface of the seal, thereby causing the liquid to flow back towards the bearing housing.

BRIEF DESCRIPTION OF THE DRAWINGS

Advantages of the present invention will be readily appreciated as the same becomes better understood by reference to the following detailed description when considered in connection with the accompanying drawings wherein:

FIG. 4 is a perspective view of a linear section which is wound in a helical manner to form the shaft seals in FIG. 1;

FIG. 5 is a perspective view of one of the shaft seals;

FIG. 6 is an end view of a shaft seal according to an alternative embodiment of the invention; and FIG. 7 is a cross-sectional view of the shaft seal taken along lines 7-7 in FIG. 6.

DETAILED DESCRIPTION OF THE EMBODIMENTS

Figure 1:
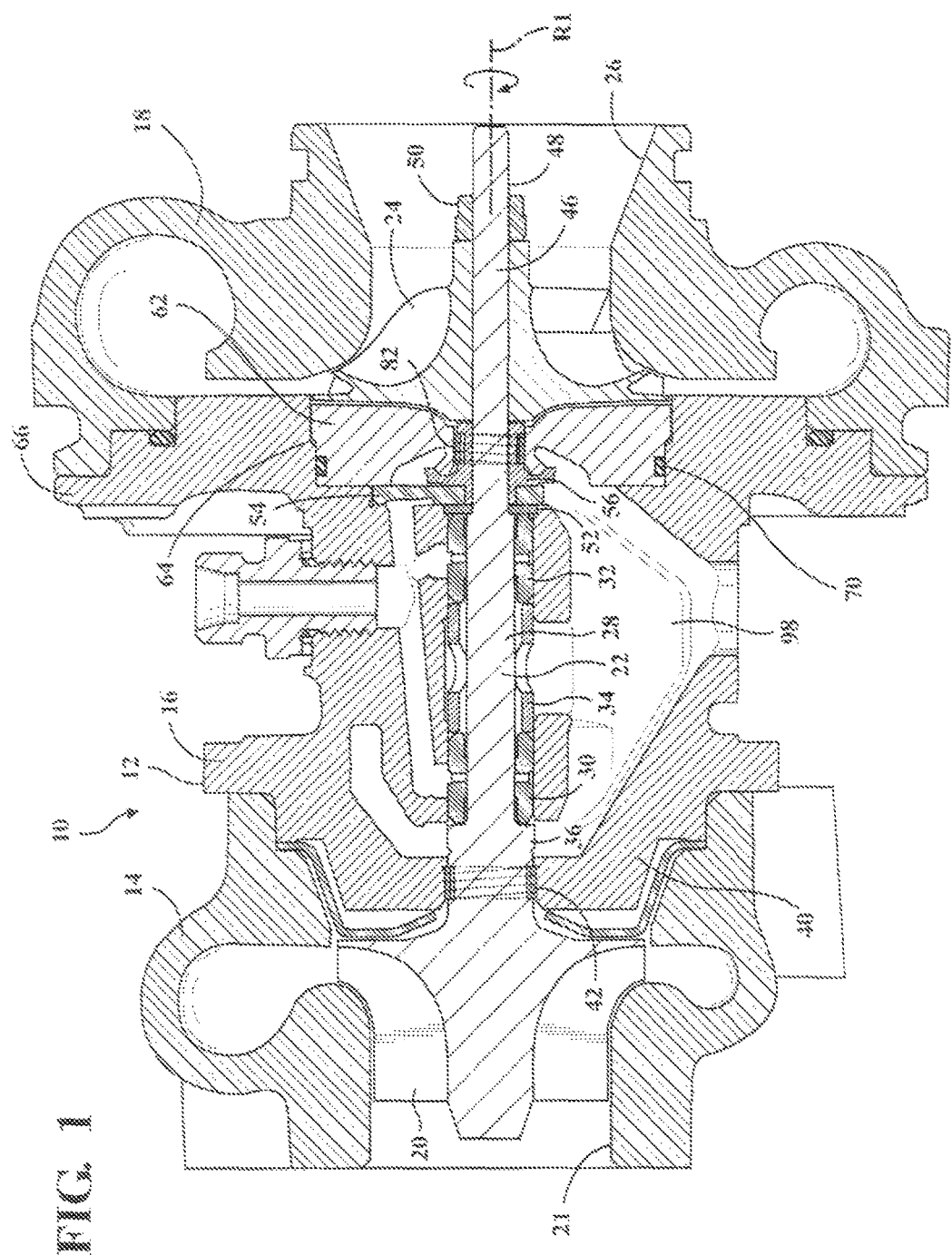
FIG. 1 is a cross-sectional view of a turbocharger including shaft seals according to a first embodiment of the invention.
Figure 2:
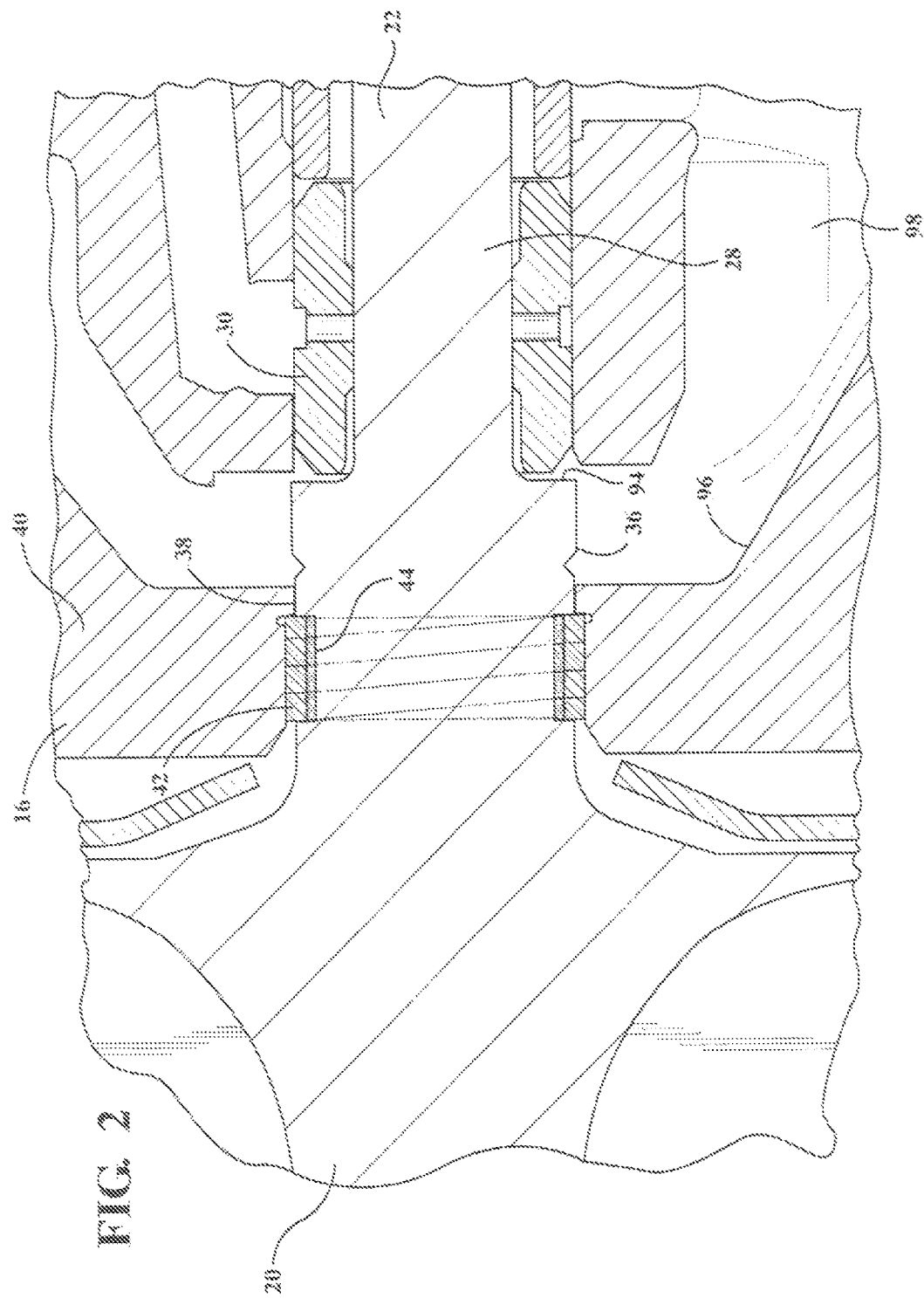
FIG. 2 is a cross-sectional view of the turbocharger illustrating a turbine side in detail.
Figure 3:
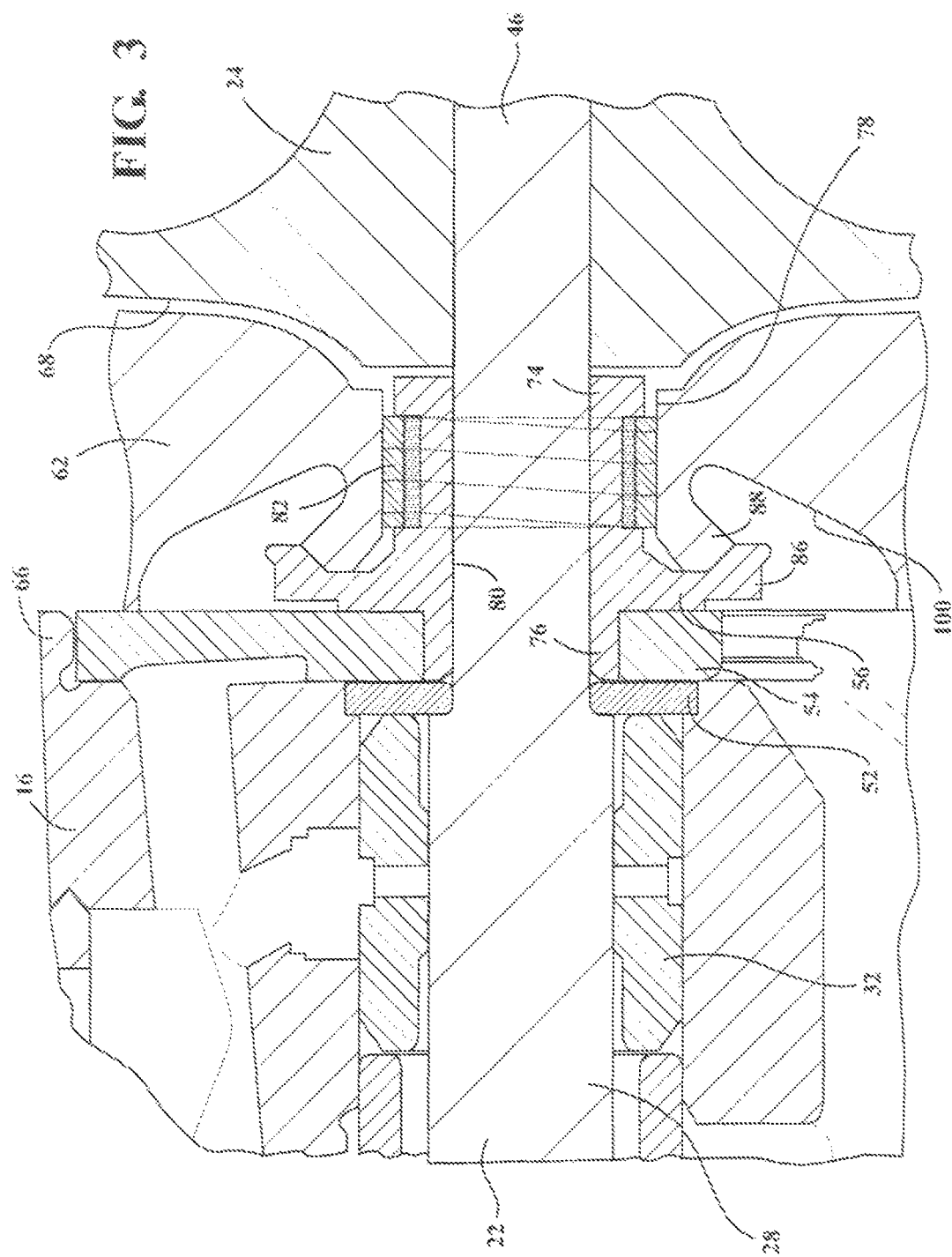
FIG. 3 is a cross-sectional view of the turbocharger illustrating a compressor side in detail.

Referring to FIGS. 1-3, a turbocharger is illustrated generally at 10. The turbocharger 10 includes a housing assembly 12 consisting of a turbine housing 14, a bearing housing 16, and a compressor housing 18 that are connected to each other. A turbine wheel 20 is disposed in the turbine housing 14 and is rotatably driven by an inflow of exhaust gas supplied from an engine exhaust manifold. After driving the turbine wheel 20, exhaust gas is discharged from the turbine housing 14 through a central exit pipe or exducer 21. A shaft 22 that is rotatably supported in the bearing housing 16 connects the turbine wheel 20 to a compressor impeller 24 in the compressor housing 18 such that rotation of the turbine wheel 20 causes rotation of the compressor impeller 24. The shaft 22 connecting the turbine wheel 20 and the compressor impeller 24 defines an axis of rotation R1 that extends in an axial direction. As the compressor impeller 24 rotates, air is drawn into the compressor housing 18 through an inlet passage 26 and is compressed by the compressor impeller 24 and compressor housing 18 to be delivered at an elevated pressure to an engine intake manifold.

A main portion 28 of the shaft 22 is rotatably supported in the bearing housing 16 by first and second journal bearings 30, 32 that are spaced apart in the axial direction. A spacer sleeve 34 surrounds the shaft 22 and is disposed between the first and second journal bearings 30, 32. The turbine wheel 20 is typically butt welded to one end of the shaft 22 having an enlarged diameter portion 36. The shaft 22 enters the bearing housing 16 though a piston ring bore 38 that is formed in a turbine side 40 of the bearing housing 16. The enlarged diameter portion 36 of the shaft 22 is disposed in the piston ring bore 38. A shaft seal 42 encircles the enlarged diameter portion 36 of the shaft 22 and is compressed by the bearing housing 16 into a groove 44 formed in the enlarged diameter portion 36. As such, the shaft seal 42 forms a labyrinth seal between the shaft 22 and the bearing housing 16. The labyrinth seal provides a tortuous path to help prevent a liquid, such as oil, from leaking out of the bearing housing 16 and into the turbine housing 14.

An opposite end of the shaft 22 has a reduced diameter portion 46 on which the compressor impeller 24 is mounted. A distal end 48 of the shaft 22 is threaded and a compressor nut 50 threadably engages the distal end 48 to securely retain the compressor impeller 24 on the shaft 22. The first and second journal bearings 30, 32 and the spacer sleeve 34 are positioned along the main portion 28 of the shaft 22 between the enlarged diameter portion 36 and the reduced diameter portion 46. Adjacent to the second journal bearing 32, the reduced diameter portion 46 of the shaft 22 carries a thrust ring 52, such as a washer or similar device, which cooperates with a stationary thrust bearing member 54 to handle axial loads acting on the shaft 22. The reduced diameter portion 46 also passes through a flinger sleeve 56 and exits the bearing housing 16 through a bearing housing cover or backplate 62. The thrust ring 52, thrust bearing member 54, flinger sleeve 56, and bearing housing cover 62 are assembled into a thrust bearing pocket 64 which is formed in a compressor side 66 of the bearing housing 16.

The flinger sleeve 56 and bearing housing cover 62 cooperate to prevent oil from being sucked into the compressor housing 18 and to keep the compressed air from leaking into the bearing housing 16. The bearing housing cover 62 is located adjacent to a back-wall 68 of the compressor impeller 24 and is fixedly secured to the bearing housing 16. An O-ring 70 is seated around an outer circumference of the bearing housing cover 62 and forms a seal between the bearing housing cover 62 and the bearing housing 16.

The flinger sleeve 56 extends between an outer end 74 that is adjacent to the compressor impeller 24 and an inner end 76 that is adjacent to the thrust bearing member 54. The flinger sleeve 56 passes through a piston ring bore 78 in the bearing housing cover 62. The flinger sleeve 56 includes a cylindrical bore 80 extending between the outer end 74 and the inner end 76 thereof. The shaft 22 exits the bearing housing 16 through the cylindrical bore 80 of the flinger sleeve 56 and the flinger sleeve 56 is pressed on and rotates with the shaft 22. A shaft seal 82 encircles the flinger sleeve 56 and is compressed by the bearing housing cover 62 into a groove 84 formed in the outer end 74 of the flinger sleeve 56. As such, the shaft seal 82 forms a labyrinth seal between the flinger sleeve 56 and the bearing housing cover 62. The labyrinth seal provides a tortuous path to help prevent oil from leaking out of the bearing housing 16 and into compressor housing 18.

The flinger sleeve 56 also includes a lip 86 having a circumference that is greater than a circumference of each of the outer end 74 and the inner end 76. The lip 86 is disposed between the thrust bearing member 54 and the bearing housing cover 62. The bearing housing cover 62 also has a lip 88 that cooperates with the lip 86 on the flinger sleeve 56 to direct oil within the bearing housing 16, as is described below.

Exhaust gas is prevented from migrating into or entering the bearing housing 16 on the turbine side 40 by the shaft seal 42 located between the shaft 22 and the bearing housing 16. Compressed air is prevented from migrating into or entering the bearing housing 16 on the compressor side 66 by the shaft seal 82 located between the flinger sleeve 56 and the bearing housing cover 62 and by the O-ring 70 located between the bearing housing cover 62 and the bearing housing 16.

Oil circulates through the bearing housing 16 to provide lubrication to the first and second journal bearings 30, 32 and to cool the shaft 22 and bearing housing 16 and some of the other turbocharger parts. On the turbine side 40, as the shaft 22 rotates, oil leaving the first journal bearing 30 is picked up by a face 94 of the enlarged diameter portion 36 and is directed into an oil passage 96 which directs the oil into an oil drain cavity 98 within the bearing housing 16. On the compressor side 66, as the shaft 22 rotates, oil leaving the second journal bearing 32 is picked up by the lip 86 of the flinger sleeve 56 and is directed against an inner surface 100 of the bearing housing cover 62 which directs the oil into the oil drain cavity 98 within the bearing housing 16.

Pressure in the turbine housing 14 is generally greater than pressure in the bearing housing 16 such that oil does not tend to leak past the shaft seal 42 on the turbine side 40 of the bearing housing 16. Similarly, pressure in the compressor housing 18 is generally greater than the pressure in the bearing housing 16 such that oil does not tend to leak past the shaft seal 82 on the compressor side 66 of the bearing housing 16. However, the shaft seal 42 on the turbine side 40 and the shaft seal 82 on the compressor side 66 are not fluid-tight. Thus, under some engine operating conditions, when the pressure in the turbine housing 14 and/or the pressure in the compressor housing 18 is less than the pressure in the bearing housing 16, oil will tend to leak past conventional shaft seals, such as conventional piston ring seals.

To prevent oil from leaking past the shaft seals 42, 82 under such conditions, the shaft seals 42, 82 are constructed in a helical manner to form a cylindrical body having a cylindrical bore extending therethrough. More specifically, each one of the shaft seals 42, 82 is formed from a linear section 102 having an outer surface 104, an inner surface 106, and opposite side walls 108, 110, as shown in FIG. 4. A plurality of striations 112 on the inner surface 106 is a series of generally parallel ridges that extend lengthwise along the linear section 102. The striations 112 are generally parallel to the side walls 108, 110 and can be formed using any of a variety of well-known methods. The linear section 102 is wound in a manner to form a helical coil including a plurality of turns or loops 114, as shown in FIG. 5. Each loop 114 of the coil abuts each adjacent loop 114. In other words, the side wall 110 of one loop 114 abuts the side wall 108 of the adjacent loop 114, and so on. End faces 116, 118 of the shaft seals 42, 82 are closed and ground such that the end faces 116, 118 are generally perpendicular to the axis of rotation R1 of the shaft 22. Since the linear section 102 is wound to form the helical coil, the striations 112 are disposed at an angle relative to the end faces 116, 118 such that the striations 112 form a plurality of helixes on the inner surface 106 of the shaft seals 42, 82. It is appreciated that the abutting side walls 108, 110 of each loop 114 also form a helix that is generally parallel to the helixes formed by the striations 112. The helixes formed by the striations 112 and the helix formed by the abutting side walls 108, 110 provide a tortuous path to help prevent oil from leaking out of the bearing housing 16.

The direction of the helixes of the shaft seal 42 on the turbine side 40 of the bearing housing 16 is opposite to the direction of the helixes of the shaft seal 82 on the compressor side 66 of the bearing housing 16. The direction of the helixes of the shaft seals 42, 82 is dictated by the direction of rotation of the shaft 22 and fluid flow needs. For example, in the present embodiment, if the direction of rotation of the shaft 22 is counterclockwise when viewed from the compressor side 66 towards the turbine side 40, the helixes of the shaft seal 42 will be right-hand helixes and the helixes of the shaft seal 82 will be left-hand helixes. The rotation of the shaft 22 relative to the helixes of the shaft seal 42 on the turbine side 40, coupled with the viscous nature of oil, produces a pumping effect on oil present in the space between the outer surface of the shaft 22 and the inner surface 106 of the shaft seal 42. The direction of shaft rotation and the direction of the helixes of the shaft seal 42 are arranged such that a pressure gradient generated by the pumping effect causes oil to flow back towards the bearing housing 16, thus preventing oil from migrating into the turbine housing 14. Similarly, the rotation of the shaft 22 relative to the helixes of the shaft seal 82 on the compressor side 66, coupled with the viscous nature of oil, produces a pumping effect on oil present in the space between the outer surface of the flinger sleeve 56 and the inner surface 106 of the shaft seal 82. The direction of shaft rotation and the direction of the helixes of the shaft seal 82 are arranged such that a pressure gradient generated by the pumping effect causes oil to flow back towards the bearing housing 16, thus preventing oil from migrating into the compressor housing 18.

In a first alternative embodiment, the striations 112 are removed from the inner surface 106 of the shaft seals 42, 82 and the helixes formed by the side walls 108, 110 are solely relied upon to direct oil back towards the bearing housing 16.

In a second alternative embodiment, the groove 44 is eliminated from the enlarged diameter portion 36 of the shaft 22 and the shaft seal 42 is biased outwardly into a groove formed in the bearing housing 16. This allows for the use of a continuous shaft surface. Similarly, the groove 84 is eliminated from the flinger sleeve 56 and the shaft seal 82 is biased outwardly into a groove formed in the bearing housing cover 62. This allows for the use of a continuous flinger sleeve surface.

In a third alternative embodiment, referring to FIGS. 6 and 7, a shaft seal 120 is formed as a single C-shaped coil similar to a convention piston ring seal. The shaft seal 120 is compressed into the groove 44 in the enlarged diameter portion 36 of the shaft 22 and/or the groove 84 in the flinger sleeve 56. The shaft seal 120 includes end faces 122, 124 that are generally perpendicular to the axis of rotation R1 of the shaft 22. An inner surface 126 of the shaft seal 120 includes a plurality of striations 128 that is disposed at an angle relative to the end faces 122, 124 such that the striations 128 form helixes about the shaft 22. The direction of shaft rotation and the direction of the helixes are arranged such that a pressure gradient generated by the pumping effect causes oil to flow back towards the bearing housing 16.

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seal (42, 82) for a shaft (22) of a turbocharger (10) to prevent liquid from leaking out of a bearing housing (16), said seal (42, 82) comprising:

a cylindrical body extending between opposite end faces (116, 118) and including a cylindrical bore extending between said opposite end faces (116, 118) for receiving the shaft (22) therethrough, said cylindrical bore defining an inner surface (106) having a plurality of striations (112) extending in a helical direction about the shaft (22);

wherein rotation of the shaft (22) relative to said seal (42, 82) causes a pumping effect on liquid present between the shaft (22) and said inner surface (106) of said seal (42, 82), thereby causing the liquid to flow back towards the bearing housing (16);

wherein said helical direction of said at least one striation (112) is opposite to a direction of rotation of the shaft (22) when viewed from within the bearing housing (16);

wherein each one of said plurality of striations (112) is parallel with one another; and wherein said cylindrical body is a helical coil including a plurality of loops (114), wherein each of said plurality of loops (114) directly abuts each adjacent one of said plurality of loops (114).

2. The seal (42, 82) as set forth in claim 1 wherein each of said plurality of loops (114) includes opposite first and second side walls (108, 110), wherein said first side wall (108) of one of said plurality of loops (114) abuts said second side wall (110) of an adjacent one of said plurality of loops (114) such that said first and second side walls (108, 110) extend in said helical direction about the shaft (22).

3. The seal as set forth in claim 2 wherein said opposite end faces (116, 118) of said cylindrical body are perpendicular to the shaft (22).

4. A turbocharger (10) for an internal combustion engine comprising:
   a housing assembly (12) including a first housing (14) and a second housing (16) coupled to said first housing (14), wherein said second housing (16) includes a liquid disposed therein;
   a shaft (22) extending through said second housing (16) and into said first housing (14), said shaft (22) rotatable about an axis of rotation; and
   a first seal (42) encircling said shaft (22) and disposed radially between said shaft (22) and said second housing (16) to prevent liquid from leaking out of said second housing (16) into said first housing (14), said first seal (42) including a cylindrical body extending between opposite end faces (116, 118) and having a cylindrical bore extending between said opposite end faces (116, 118) for receiving said shaft (22) therethrough, said cylindrical bore defining an inner surface (106) with at least one striation (112) extending in a first helical direction about said shaft (22);
   wherein rotation of said shaft (22) relative to said first seal causes a pumping effect on said liquid present between said shaft (22) and said inner surface (106) of said first seal (42), thereby causing said liquid to flow back towards said second housing (16);
   wherein said first helical direction of said at least one striation (112) on said first seal is opposite to a direction of rotation of said shaft (22) when viewed from within said second housing (16); and
   wherein said cylindrical body is a helical coil including a plurality of loops (114), wherein each of said plurality of loops (114) directly abuts each adjacent one of said plurality of loops (114).

5. The turbocharger (10) as set forth in claim 4 wherein said opposite end faces (116, 118) of said cylindrical body are perpendicular to said axis of rotation.

\* \* \* \* \*